US012254496B1

United States Patent
Norris et al.

(10) Patent No.: US 12,254,496 B1
(45) Date of Patent: Mar. 18, 2025

(54) SYSTEM AND METHOD FOR PROVIDING DATA USING AUDIO

(71) Applicant: Sunrise R&D Holdings, LLC, Cincinnati, OH (US)

(72) Inventors: Christopher D. Norris, Cincinnati, OH (US); Eron N. Bucciarelli, Covington, KY (US); Wesley Rhodes, Loveland, OH (US)

(73) Assignee: SUNRISE R&D HOLDINGS, LLC, Cincinnati, OH (US)

( * ) Notice: Subject to any disclaimer, the term of this patent is extended or adjusted under 35 U.S.C. 154(b) by 303 days.

(21) Appl. No.: 17/405,781

(22) Filed: Aug. 18, 2021

(51) Int. Cl.
*G06Q 30/02* (2023.01)
*G06F 3/16* (2006.01)
(Continued)

(52) U.S. Cl.
CPC ......... *G06Q 30/0281* (2013.01); *G06F 3/167* (2013.01); *G09F 9/30* (2013.01);
(Continued)

(58) Field of Classification Search
CPC .......... G06Q 30/0281; G06Q 30/0623; G06Q 30/0639; G06F 3/167; G09F 9/30; H04W 4/33; H04W 4/35; H04W 76/10
(Continued)

(56) References Cited

U.S. PATENT DOCUMENTS 7,536,478 B2  5/2009  Philyaw et al.
8,489,112 B2  7/2013  Roeding et al.
(Continued)

FOREIGN PATENT DOCUMENTS

GB  2526518 A  12/2015
WO  2019/036094 A1  2/2019
WO  2019/040149 A1  2/2019

OTHER PUBLICATIONS

Chung, M. "Effective near advertisement transmission method for smart-devices using inaudible high-frequencies." Multimedia Tools and Applications, 75(10), 5871-5886. Mar. 21, 2015. doi:http://dx.doi.org/10.1007/s11042-015-2553-1 (Year: 2015).*

(Continued)

*Primary Examiner* — Jonathan P Ouellette
(74) *Attorney, Agent, or Firm* — Stites & Harbison, PLLC; Terry L. Wright; Gary N. Stewart

(57) ABSTRACT

Systems and methods for communicating data to an individual within a physical store using audio utilize: a central server in communication with a database storing store-related data; a display unit for displaying information; an audio transmitter that is configured to transmit an audio signal to a designated area within the physical store; and a mobile device associated with the individual. An audio signal is transmitted to the designated area. The mobile device receives and processes the transmitted audio signal and initiates a communication between the mobile device and the central server based thereon. The communication can include initializing a communication channel between the mobile device and the central server and/or the central server communicating store-related data to the mobile device in response to a request for the same. In one embodiment and implementation, the central server communicates requested store-related data to the mobile device and the display unit.

18 Claims, 5 Drawing Sheets

(51) Int. Cl.
*G06Q 10/10* (2023.01)
*G06Q 30/016* (2023.01)
*G06Q 30/06* (2023.01)
*G09F 9/30* (2006.01)
*H04W 4/33* (2018.01)
*H04W 4/35* (2018.01)
*H04W 76/10* (2018.01)
*G06Q 30/0601* (2023.01)

(52) U.S. Cl.
CPC ............... *H04W 4/33* (2018.02); *H04W 4/35* (2018.02); *H04W 76/10* (2018.02); *G06Q 30/0623* (2013.01); *G06Q 30/0639* (2013.01)

(58) Field of Classification Search
USPC .......................................... 705/1.1–912, 346
See application file for complete search history.

(56) References Cited

U.S. PATENT DOCUMENTS

| | | | |
|---|---|---|---|
| 8,514,662 B2 | 8/2013 | Paulson | |
| 9,202,235 B2 | 12/2015 | Meiss et al. | |
| 9,264,151 B1 | 2/2016 | Emigh et al. | |
| 9,628,514 B2 | 4/2017 | Kaufman | |
| 9,836,737 B2 | 12/2017 | Cooke et al. | |
| 9,886,696 B2 | 2/2018 | Roeding et al. | |
| 9,940,638 B2 | 4/2018 | Horowitz et al. | |
| 10,078,830 B2 | 9/2018 | Dragushan et al. | |
| 10,623,111 B2 | 4/2020 | Koksal et al. | |
| 11,790,437 B1* | 10/2023 | Hazlewood | G06Q 30/0635 705/26.7 |
| 2004/0155109 A1 | 8/2004 | Kenney et al. | |
| 2010/0222041 A1* | 9/2010 | Dragt | G06Q 30/02 455/414.2 |
| 2011/0029364 A1* | 2/2011 | Roeding | G06Q 30/0207 705/14.27 |
| 2011/0182445 A1* | 7/2011 | Atsmon | G06F 21/35 381/123 |
| 2012/0179525 A1 | 7/2012 | Sequin et al. | |
| 2013/0203345 A1* | 8/2013 | Fisher | H04B 11/00 455/41.1 |
| 2013/0297422 A1* | 11/2013 | Hunter | H04H 60/63 705/14.58 |
| 2015/0012421 A1 | 1/2015 | Alexeev | |
| 2015/0058728 A1 | 2/2015 | Haggerty | |
| 2015/0193841 A1* | 7/2015 | Bernard | G06Q 30/0641 705/346 |
| 2018/0247297 A1 | 8/2018 | Misek et al. | |
| 2019/0026723 A1 | 1/2019 | Narasimhan et al. | |
| 2019/0289422 A1* | 9/2019 | Kao | H04W 4/02 |
| 2019/0311422 A1 | 10/2019 | Davis et al. | |
| 2021/0056580 A1* | 2/2021 | Walker | G06Q 30/0222 |

OTHER PUBLICATIONS

"Cue Retail" www.cueaudio.com (Apr. 7, 2019). https://web.archive.org/web/20190407215443/https://www.cueaudio.com/retail/.
"LISNR" lisnr.com (Jul. 17, 2019). "How to Take Ownership of the Retail Payment Experience." https://lisnr.com/resources/blog/own-retail-payment-experience/.
Prandoni, Paolo, and Martin Vetterli. "Perceptually hidden data transmission over audio signals." Proceedings of the 1998 IEEE International Conference on Acoustics, Speech and Signal Processing, ICASSP'98 (Cat. No. 98CH36181). vol. 6. IEEE, 1998. http://citeseerx.ist.psu.edu/viewdoc/download?doi=10.1.1.15.3046&rep=rep1&type=pdf.
Ixtenso.com. "Shopkick blows past 15 million users, doubles in one year" (Sep. 14, 2015). https://ixtenso.com/retail-marketing/shopkick-blows-past-15-million-users-doubles-in-one-year.html.
wired.com. "Hundreds of Apps Can Listen for Marketing 'Beacons' You Can't Hear" (May 2, 2017). https://www.wired.com/2017/05/hundreds-apps-can-listen-beacons-cant-hear/.

* cited by examiner

SYSTEM AND METHOD FOR PROVIDING DATA USING AUDIO

TECHNICAL FIELD

The present invention relates to systems and methods for communicating data to an individual within a physical store. More particularly, the present invention relates to a system and method in which audio is utilized to initiate communication between a mobile device located within a physical store and a store-related entity and facilitate transmission of store-related data to an individual.

BACKGROUND

Retailers, including grocery stores, commonly attempt to engage customers entering a physical store through digital means, such as through a retailer-based application installed on a customer's mobile device, to promote brand awareness and customer loyalty. These applications typically provide various features and functionalities which, when used, enable customers to access information about the products within the store or the retailer, digital coupons, promotions, or other information relating to the retailer. As these applications can be hosted on an individual's personal mobile device, they can also help to reduce the extent individuals must engage with devices or materials in which others may have touched to retrieve such information. In this regard, the use of such applications can also help to reduce the spread of germs or disease. The use of such retailer-based applications can thus improve or enhance a customer's in-store shopping experience. Often times, however, such applications go unutilized or underutilized as a result of forgetting to utilize the application while shopping in-store, causing customers to miss out on valuable information or offers which can reduce costs and save them money.

Accordingly, systems and methods that provide for improved distribution of information to individuals within a physical store would be both highly desirable and beneficial.

SUMMARY

The present invention relates to systems and methods for communicating data to an individual within a physical store. More particularly, the present invention relates to a system and method in which communication between a mobile device and a central server associated with a store is initiated in response to the mobile device receiving an audio signal in a designated area of the store.

In an exemplary embodiment, a system for communicating data to an individual within a physical store using audio includes: a central server that is operably connected to (in communication with) a database storing store-related data; a display unit for displaying information to the individual; an audio transmitter that is configured to transmit an audio signal to a designated area within the physical store; and a mobile device associated with the individual. The mobile device is in communication with the central server via a software application installed on the mobile device and includes a microphone for receiving the audio signal while the mobile device is located in the designated area. To avoid disrupting the shopping experience of individuals located within the physical store, the audio signal is preferably at an inaudible sound frequency, which can be detected by the microphone of the mobile device, but not heard by humans.

When received and processed by the mobile device, the audio signal initiates a communication between the mobile device and the central server. The type of communication initiated may vary depending on the nature of the audio signal received and processed by the mobile device. In one embodiment, the communication initiated by the audio signal includes initializing a communication channel between the mobile device and the central computer through which additional information can be subsequently exchanged. Once the communication channel is established, the mobile device can transmit requests for store-related data in response to the individual associated with the mobile device making selections or otherwise interacting with an interface presented on the mobile device by the software application. In another embodiment, the communication initiated by the audio signal includes the mobile device transmitting a request for store-related data in response to receiving the audio signal and the central server communicating the requested store-related data to the mobile device. In some embodiments, the central server may be configured to end the communication in response to the mobile device being positioned outside of the designated area.

In some embodiments, the display unit is in communication with the central server and includes a display for displaying information received from the central server. In some embodiments, the central server is configured to transmit data retrieved from the database in response to a request transmitted from the mobile device to both the mobile device and the display unit for display thereon. In one such embodiment, the store-related data communicated to the mobile device is different from the store-related data communicated to the display unit.

In some embodiments, the system includes a plurality of audio transmitters, a plurality of display units, and/or a plurality of mobile devices.

In an exemplary implementation of a method for communicating data to an individual within a physical store using audio, an audio signal is transmitted to a designated area within a physical store located proximate to a display unit for displaying information to the individual. The audio signal is received and processed by a mobile device, which subsequently initiates a communication between the mobile device and a central server based on the audio signal, where the central server is in communication with a database storing store-related data.

In some implementations, the communication between the mobile device and the central server includes initializing a communication channel between the mobile device and the central server through which store-related data can be communicated to the mobile device. In one such implementation, the exemplary method for communicating data to an individual within a physical store using audio may further include the mobile device transmitting requests for store-related data in response to the individual associated with the mobile device making a selection or otherwise interacting with an interface presented on the mobile device.

In some implementations, the exemplary method for communicating data to an individual within a physical store using audio may further include the mobile device transmitting a request for store-related data stored in the database and the central server communicating the requested store-related data to the mobile device.

In some implementations, the exemplary method for communicating data to an individual within a physical store using audio may further include ending the communication between the mobile device and the central server in response to the mobile device being positioned outside of the designated area.

In some implementations, the exemplary method for communicating data to an individual within a physical store using audio may further include the mobile device initiating a communication between the display unit and the central server.

Further features and advantages of the present invention will become evident to those of ordinary skill in the art after a study of the description, figures, and non-limiting examples in this document.

DESCRIPTION OF EXEMPLARY EMBODIMENTS

The present invention relates to systems and methods for communicating data to an individual within a physical store, such as a grocery store. More particularly, the present invention relates to a system and method in which audio is utilized to initiate communication between a mobile device located within a physical store and a store-related entity and facilitate the transmission of store-related data to an individual.

Figure 1:
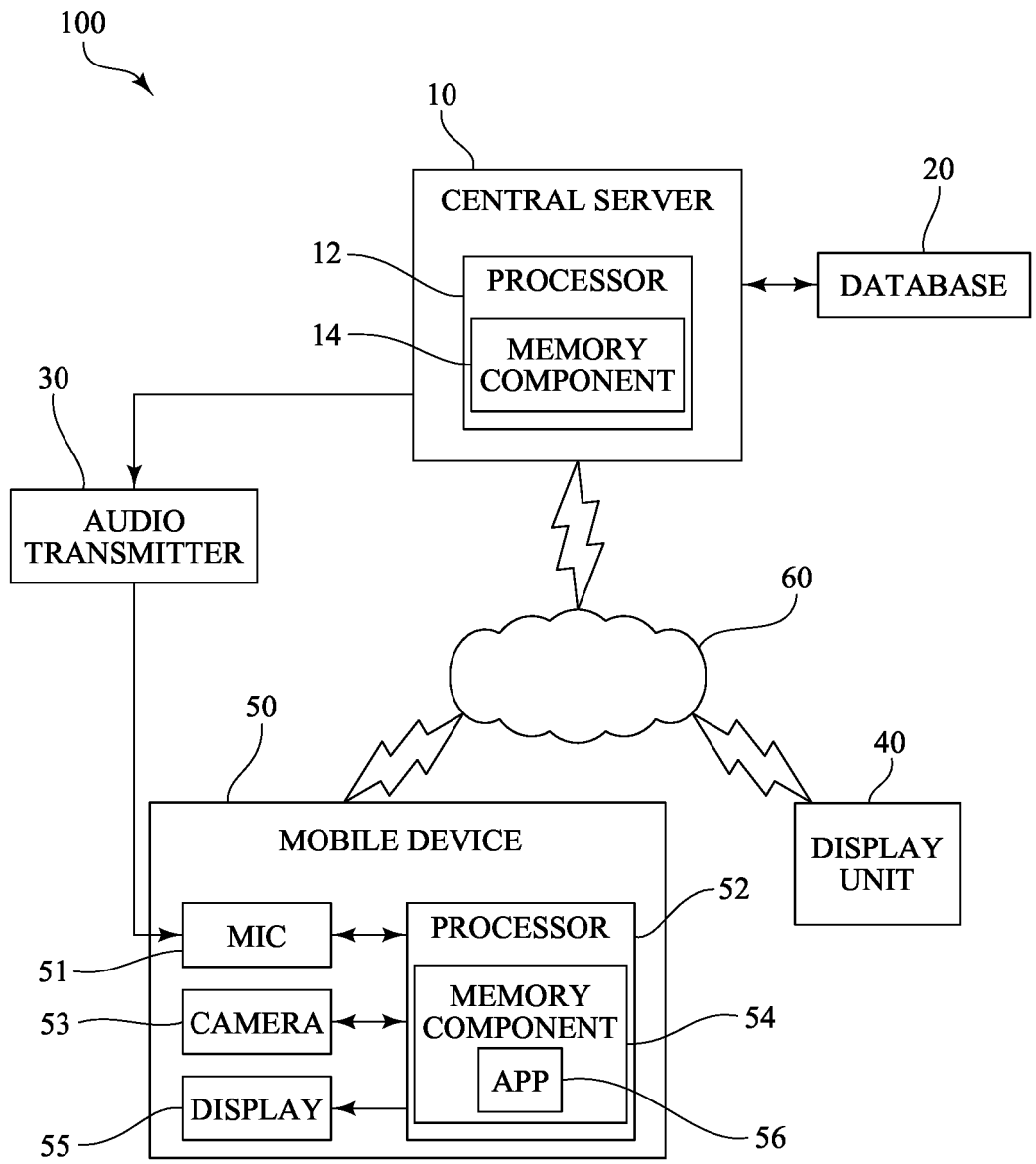
FIG. 1 is a schematic diagram showing an exemplary system for communicating data to an individual within a physical store using audio made in accordance with the present invention.
Figure 2A:
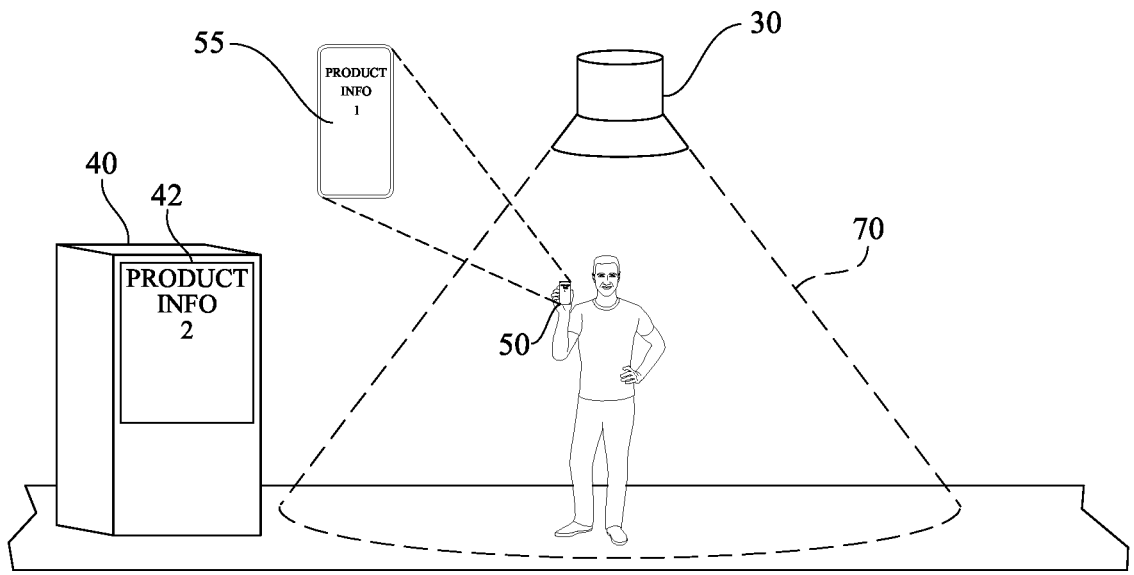
FIG. 2A is a perspective view of an individual within a designated area of a physical store in which an audio signal is being transmitted.
Figure 2B:
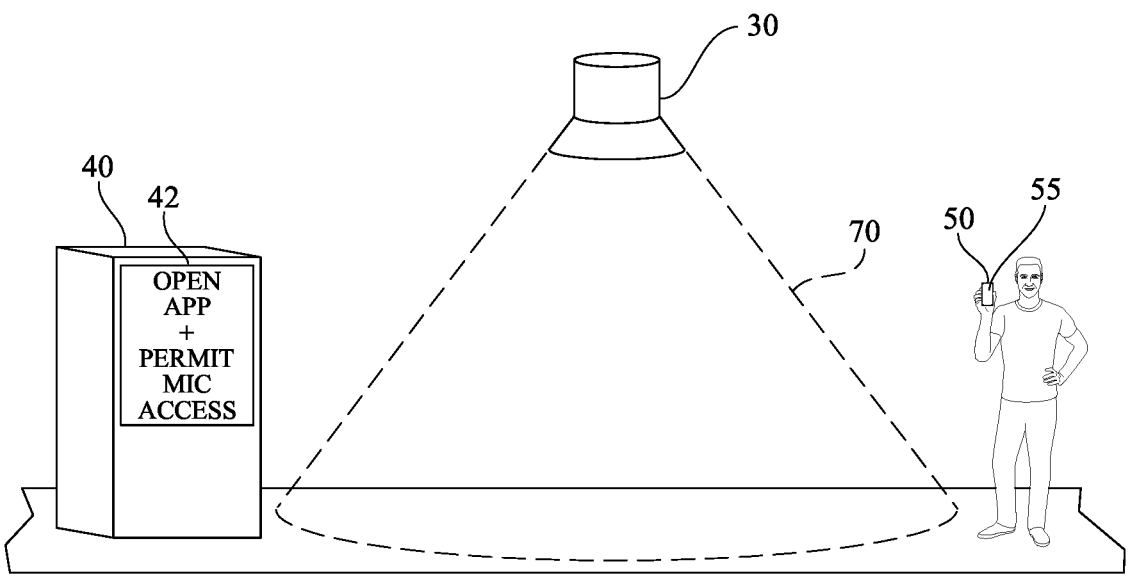
FIG. 2B is another perspective view similar to FIG. 2A, but with the individual positioned outside of the designated area.

Referring first to FIGS. 1 and 2A-2B, in one exemplary embodiment of a system for communicating data to an individual within a physical store using audio 100 (or system 100), the system 100 comprises a central server 10 that is operably connected to (in communication with) a database 20 storing store-related data; a display unit 40 for displaying information to the individual; an audio transmitter 30 configured to transmit an audio signal to a designated area 70 (as indicated by the broken lines in FIGS. 2A and 2B) within the physical store; and a mobile device 50, which is associated with the individual. The mobile device 50 is in communication with the central server 10, such that information can be selectively communicated between the mobile device 50 and the central server 10 via a software application 56 installed on the mobile device 50. The audio signal transmitted by the audio transmitter 30, when received and processed by the mobile device 50, causes the mobile device 50 to initiate a communication between the mobile device 50 and the central server 10. In this regard, the audio signal may thus be characterized as initiating a communication between the mobile device 50 and the central server 10. As described in greater detail below, such communication can include initializing a communication channel through which information can subsequently be exchanged between the mobile device 50 and the central server 10 and/or communicating store-related data stored within the database 20 to the mobile device 50 for use by the individual to which the mobile device 50 is associated.

Referring still to FIGS. 1 and 2A-2B, in this exemplary embodiment, the audio transmitter 30 is an overhead speaker positioned so as to emit the audio signal to the designated area 70. The designated area 70, in this exemplary embodiment, corresponds to an area of the physical store that is located proximate to the display unit 40 (as shown in FIGS. 2A and 2B) or in which the display unit 40 is located so that the display unit 40 can be utilized to prompt the individual associated with the mobile device 50 to perform certain actions while located in the designated area 70, as further described below. Accordingly, in this exemplary embodiment, the audio transmitter 30 does not transmit audio signals to, and the designated area 70 does not correspond to, the entirety of the physical store, but, rather, a limited area thereof. In this regard, the audio signal transmitted by the audio transmitter 30 may, in some embodiments, be tailored so as to correspond to or be associated with select in-store products located in the designated area 70 or other information relevant to the environment of the designated area 70.

To avoid disrupting the shopping experience of individuals within the store, the audio signal preferably comprises an inaudible sound frequency which can be detected by the mobile device 50, but not heard by humans. Specifically, in this exemplary embodiment, the inaudible frequency transmitted by the audio transmitter 30 is an ultrasonic frequency. The audio transmitter 30 may be selectively activated to transmit the audio signal in response to instructions (signals) communicated from a computing entity, which, in this case, is the central server 10, to which the audio transmitter 30 is in communication with or transmit the audio signal substantially continuously. Although the audio transmitter 30 is primarily described herein as being an overhead speaker, it should be appreciated that other types of audio transmitters configured to transmit audio signals may be used and/or that the audio transmitter 30 may be alternatively positioned without departing from the spirit or scope of the present disclosure. For example, in an alternative embodiment, the audio transmitter 30 may be a component of the display unit 40. Further, it should also be appreciated that the audio signal may comprise alternative frequencies (e.g., audible frequencies or infrasound frequencies) without departing from the spirit or scope of the present disclosure.

When received and processed on the mobile device 50, the audio signal causes the mobile device 50 to transmit information (e.g., a request) to the central server 10 via a wireless network 60 using known interfaces and protocols. In this way, the audio signal transmitted by the audio transmitter 30 may thus be characterized as corresponding to instructions which dictate, at least in part, the type of request transmitted from the mobile device 50 to the central server 10.

In this exemplary embodiment, the audio transmitter 30 is configured to transmit only a single audio signal. In some implementations, the audio signal may effectively act as a stimulus that initializes the establishment of a communication channel between the mobile device 50 and the central server 10. In this regard, in such implementation, the audio signal, when received and processed by the mobile device 50, causes the mobile device 50 to transmit a request to the central server 10 to establish a communication channel with the mobile device 50 (e.g., a request to establish a socket-based connection between the mobile device 50 and the central server 10) that facilitates subsequent communication of information between the mobile device 50 and the central server 10. After the communication channel between the mobile device 50 and the central server 10 is established, the mobile device 50 can subsequently transmit additional information to the central server 10 (e.g., requests for store-related data associated with products located in the designated area 70) in response to the individual associated with the mobile device 50 making selections or otherwise interacting with an interface presented on the mobile device 50 by the software application 56.

In some embodiments, the software application 56 may be configured to automatically (e.g., upon being opened on the mobile device 50) initialize a communication channel between the mobile device 50 and the central server 10. Accordingly, in some embodiments, the communication channel between the mobile device 50 and the central server 10 may be established without influence by the audio signal. In such embodiments, the audio signal may act as a stimulus which initializes the transmission of store-related data stored within the database 20 (e.g., nutritional information regarding or a digital coupon for a specific product located in or proximate to the designated area 70) to the mobile device 50. That is, the audio signal, when received and processed by the mobile device 50, causes the mobile device 50 to transmit a request by the mobile device 50 for select store-related data stored within the database 20. In some implementations, such a request may comprise transmitting audio data that identifies the audio signal to the central server 10 for subsequent processing. The audio data, when received and processed by the central server 10, causes the central server 10 to retrieve store-related data based on the identifying characteristics of the audio signal received by the mobile device. In this regard, in some embodiments, some or all of the store-related data stored in the database 20 may correspond to otherwise be associated with an audio signal transmitted by the audio transmitter 30.

In an alternative embodiment, the audio transmitter 30 may be configured to transmit a first audio signal (i.e., a first inaudible frequency) and a second audio signal (i.e., a second inaudible frequency), which, when received and processed by the mobile device 50, cause the mobile device 50 to initialize the establishment of a communication channel with the central server 10 and request select store-related data, respectively. Thus, depending on the intended application, the audio transmitter 30 may be configured to transmit a single or multiple audio signals, either simultaneously or at different times.

Referring specifically to FIG. 1, the mobile device 50 includes a microphone 51 which can be selectively activated to receive the audio signal transmitted from the audio transmitter 30. To process the received audio signal, the mobile device 50 further includes a processor 52 that is operably connected to (in communication with) the microphone 51 and is configured to execute instructions (routines) stored in a memory component 54 or other computer-readable medium, which, in this exemplary embodiment, stores the instructions of software application 56, to process the audio signal received by the microphone 51. In this exemplary embodiment, the audio signal is processed locally on the mobile device 50 using the software application 56, such that the processor 52 determines a specific request to be transmitted to the central server 10 (e.g., a request to establish a communication channel or a request for select store-related data) based on identifying characteristics (e.g., hertz value) of the audio signal received. In this regard, the software application 56 can include instructions, which, when executed by the processor 52, cause the processor 52 to associate the received audio signal with one of a predetermined number of possible requests or other information transmission options. For example, if the processor 52 determines that the received audio signal corresponds to a first frequency (e.g., 20 kHz), the processor 52 may associate the audio signal with a request for the central server 10 to establish a communication channel with the mobile device 50, whereas if the processor 52 determines that the audio signal corresponded to a second frequency (e.g., 21 kHz), the processor may associate the audio signal with a request for select store-related data (e.g., data corresponding to a specific in-store product or digital coupon).

After determining which request the received audio signal corresponds, the processor 52 of the mobile device 50 then transmits such request to the central server 10 for subsequent processing. In this regard, central server 10 also includes a processor 12 configured to execute instructions stored in a memory component 14 or other computer-readable medium to process the request received from the mobile device 50 and perform the various other operations of the central server 10 described herein. Although the central server 10 is generally illustrated and referred to herein as a single entity, it is appreciated that, in some embodiments, the central server 10 can comprise a plurality of server entities, where each server entity is in communication with one or more other servers of the plurality of server entities and includes a processor configured to execute instructions stored in a memory component or other computer-readable medium.

Alternative embodiments are also contemplated in which, instead of the processor 52 of the mobile device 50 processing the audio signal locally to determine the specific request to which the audio signal relates, the processor 52 may process the received audio signal in a manner which generates audio data that includes identifying information about the received audio signal, but does not determine the specific request to which the audio signal relates. For example, the audio data generated by processing of the audio signal on the mobile device 50 may include information that identifies what frequency the received audio signal is. After generating the audio data, the processor 52 of the mobile device 50 communicates the audio data to the central server 10 for subsequent processing to determine which one of a predetermined number of possible request options the audio signal received by the mobile device 50 corresponds. To determine which request corresponds to the received audio data, the processor 12 of the central server 10 may, in some embodiments, query the database 20 using the received audio data. In this regard, in some embodiments, the database 20 may store data which associates identifying characteristics of an audio signal (e.g., Hertz value) with a specific request (e.g., retrieve store-related data corresponding to a specific product from the database 20). Alternatively, the processor 12 of the central server 10 may make such determination locally by executing instructions stored in the memory component 14 of the central server 10 which cause the processor 52 to associate the audio data with one of multiple predetermined request options.

Referring still to FIG. 1, in this exemplary embodiment, the mobile device 50 further includes a camera 53 and a display 55. The camera 53 is operably connected to the processor 52, such that the camera 53 can be selectively activated to acquire and subsequently transmit images to the processor 52 of the mobile device 50 for subsequent processing. The display 55 is operably connected to the processor 52 of the mobile device 50, such that a user interface provided by the software application 56 and store-related data received from the central server 10 can be displayed on the display 55. Mobile devices which may be utilized in the system 100 thus include, but are not limited to, smartphones, tablets, or similar computing devices.

Store-related data stored within the database 20 may include, but is not limited to, data relating to, or which can be used in conjunction with, products offered by a retailer (e.g., product type, product price, quantity of product available, nutritional or sourcing information, digital coupons or promotions associated with a product, items which are comparable to a product, etc.) and/or data relating to the retailer itself (company history, sourcing practices, etc). The database 20 is in communication with the central server 10, such that a query of store-related data can be initiated from the central server 10 and sent to the database 20. Information matching the query can then be received by the central server 10 from the database 20 for further processing and/or transmission to another system 100 entity (e.g., to the mobile device 50 of the individual located within the designated area 70 or display unit 40).

In this exemplary embodiment, the display unit 40 includes a digital display 42 and is in communication with the central server 10, such that information can be communicated from the central server 10 to the display unit 40 for display thereon. Accordingly, in this exemplary embodiment, in response to receiving a request from the mobile device 50 for select store-related data, the central server 10 can generate and submit a query to the database 20 corresponding to the select store-related data and transmit the store-related data received from such query to the mobile device 50 or the mobile device 50 and the display unit 40 for display thereon. Thus, in some implementations, the audio signal, when received by the microphone 51 and processed by the processor 52 of the mobile device, may effectively initiate a communication between the display unit 40 and the central server 10, in addition to initiating a communication between the mobile device 50 and the display unit 40. Display units suitable for use in the system 100 include, but are not necessarily limited to, kiosks (FIGS. 2A-2B) and electronic shelf modules, such as those described in U.S. Pat. Nos. 9,703,179; 9,774,134; 10,339,579; 10,534,122; 10,580,052; 10,719,861; 10,909,595; 10,956,884; and 10,989,856, each of which are commonly owned and incorporated herein by reference in their entirety.

Referring to FIGS. 1, 2A and 2B, alternative embodiments are also contemplated in which the audio signal is transmitted by the audio transmitter 30 in response to a selection made by an individual on the display unit 40 relating to store-related data that the individual would like to access. In such embodiments, the display unit 40 includes a user interface which enables the individual to make selections (e.g., via engaging the display 42 of the display unit 40 or peripherals associated with the display unit 40) relating to store-related data. The selection is then communicated to a system 100 computing entity with which the audio transmitter 30 is in communication for subsequent processing, which, in this case, is the central server 10. After processing the selection, the central server 10 communicates instruction (signals) which cause the audio transmitter 30 to transmit an audio signal, which, when received and processed by the mobile device 50, will cause the mobile device 50 to transmit a request to the central server 10 for store-related data corresponding to the selection made by the individual on the display unit 40.

Referring specifically to FIG. 2A, in this implementation, the central server 10 is configured to communicate store-related data received from a query of the database 20 to both the mobile device 50 and the display unit 40. As shown in FIG. 2A, in one implementation, the central server 10 may communicate different portions of the store-related data received from the database 20 to the mobile device 50 and the display unit 40, as indicated by the presence of "PRODUCT INFO 1" and "PRODUCT INFO 2" on the displays 55, 42 of the mobile device 50 and display unit 40, respectively. In such embodiment, the display unit 40 thus effectively serves to extend the display 55 of the mobile device 50, which may prove particularly beneficial in instances where the size of the received store-related data exceeds that which can be displayed on the display 55 of the mobile device 50 without having to scroll. In another implementation, the central server 10 communicates the entirety of the store-related data received from the database 20 to the mobile device 50 and the display unit 40, such that the display 42 of the display unit 40 effectively duplicates (or mirrors) the display 55 of the mobile device 50. In some implementations, whether the entirety of the store-related data received from the query of the database 20 is communicated to both the mobile device 50 and the display unit 40 in its entirety or is divided into portions, may be based on the size of the store-related data received. For instance, if the size of the received store-related data exceeds a predetermined threshold, different portions of the store-related data will be communicated to the mobile device 50 and the display unit 40. In some implementations, the store-related data retrieved by the central server 10 from the database 20 may include indicia (e.g., a QR code) corresponding to a digital coupon. In such implementations, the central server 10 may communicate such indicia to the display unit 40 for display thereon and the individual can claim the coupon by capturing an image of the indicia using the camera 53 of the mobile device 50.

Figure 5:
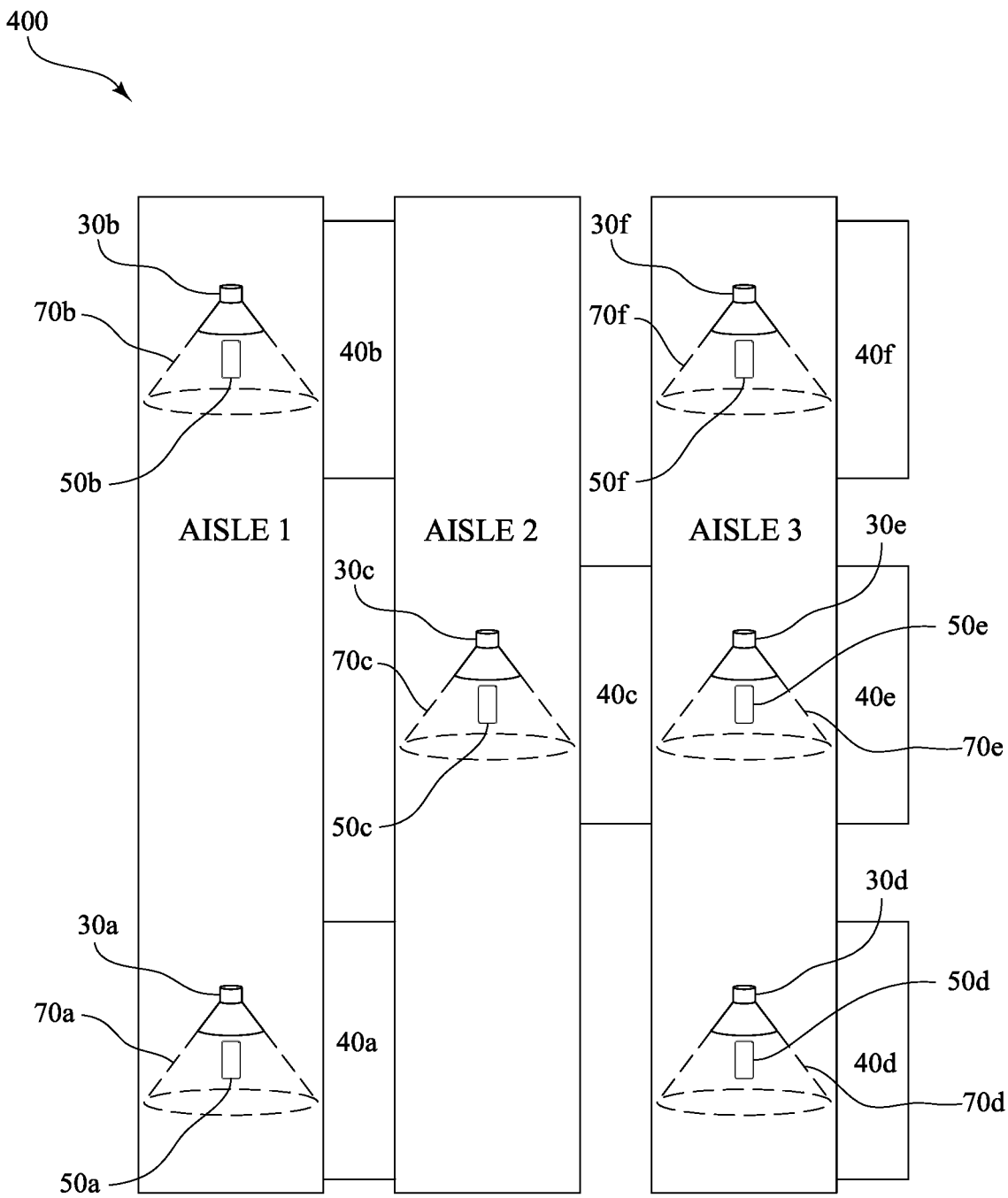
FIG. 5 is a schematic view of another exemplary system for communicating data to an individual within a physical store using audio made in accordance with the present invention.

Although the system 100 described above with reference to FIGS. 1 and 2A-2B is referred to as including a single audio transmitter 30, display unit 40, and mobile device 50, it should be appreciated that, in alternative embodiments, the system 100 can include a plurality of audio transmitters 30, a plurality of display units 40, and/or a plurality of mobile devices 50. In this regard, FIG. 5 shows another exemplary system for communicating data to an individual within a physical store using audio 400 (or system 400) made in accordance with the present invention. In this exemplary embodiment the system 400 includes a plurality of audio transmitters 30a-f, a plurality of display units 40a-f, and a plurality of mobile devices 50a-f associated with different individuals located within the physical store are in use. As shown, in this exemplary embodiment, the plurality of audio transmitters 30a-f are configured to transmit audio signals to different designated areas 70a-f within the physical store that are located proximate to different display units 40a-f, which, in this case, are electronic shelf modules, positioned along the aisles of the physical store. Each audio transmitter of the plurality of audio transmitters 30a-f, each display unit of the plurality of display units 40a-f, and each mobile device of the plurality of mobile devices 50a-f is operably connected to the central server 10 and includes the same features and provide the same functionality as that of the audio transmitter 30, display unit 40, and mobile device 50, respectively, of the system 100 described above with reference to FIGS. 1 and 2A-B. In some implementations, each audio transmitter of the plurality of audio transmitters 30a-f may be configured to transmit a different audio signal than the other audio transmitters 30a-f within the system 400 to initiate different types of communications (e.g., requests for store-related data of different products located along the aisles) between the mobile device 50 of an individual and the central server 10 as the individual moves through the physical store.

Figure 3:
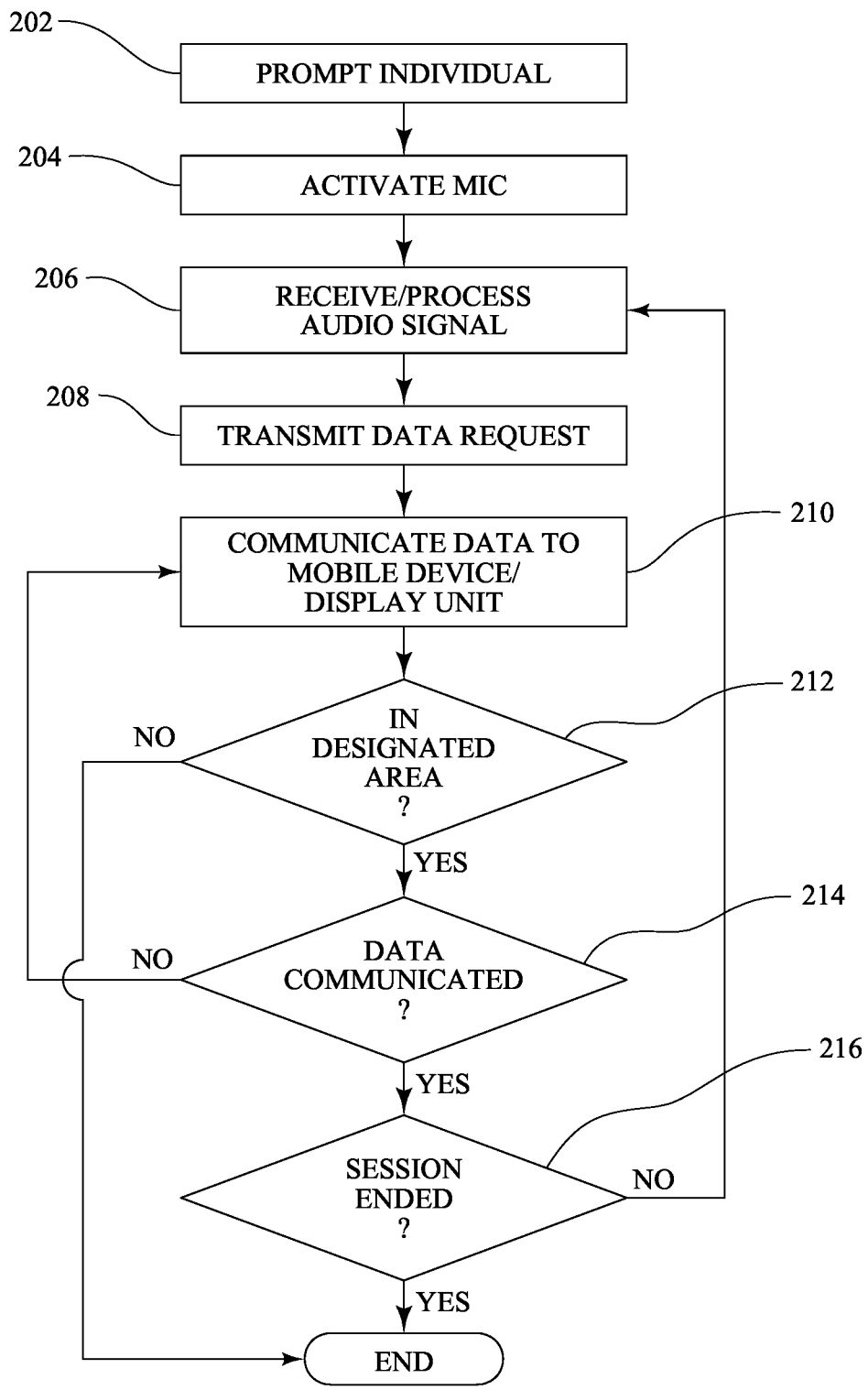
FIG. 3 is a flow diagram of an exemplary method for communicating data to an individual within a physical store using audio in accordance with the present invention.

Referring now generally to FIGS. 1, 2A-2B, and 3, FIG. 3 is a flow diagram of a method for communicating data to an individual within a physical store using audio, which utilizes the exemplary system 100 described above with reference to FIGS. 1 and 2A-B. In this exemplary method, when the mobile device 50 associated with the individual enters the designated area 70 (FIG. 2A), the microphone 51 of the mobile device 50 can be activated to receive the audio signal transmitted by the audio transmitter 30, as indicated by step 204 in FIG. 3. Typically, activation of the microphone 51 is achieved by the individual providing the software application 56 access to the microphone 51 in response to a prompt generated by the software application 56. To promote the individual to open of the software application 56 on the mobile device 50 (i.e., run the software application) and provide the software application 56 access to the microphone 51 while the individual is located in the designated area 70, in this exemplary method, the display unit 40 is initially configured to display a prompt promoting such actions, as shown on the display 42 of the display unit 40 in FIG. 2B and as indicated in step 202 in FIG. 3.

Referring still to FIGS. 1, 2A-2B, and 3, in this exemplary method, the audio transmitter 30 is configured to transmit the audio signal substantially continuously. As such, as soon as the mobile device 50 enters the designated area 70 and the software application 56 is permitted access to the microphone 51, the audio signal is received and processed by the mobile device 50 using the software application 56 to initiate a communication between the mobile device 50 and the central server 10, as indicated by step 206 in FIG. 3. In this exemplary method, the audio signal is processed locally on the mobile device 50 in the manner described above so that a specific request is derived from the processed audio signal and subsequently communicated from the mobile device 50 to the central server 10 for processing. In alternative methods, the audio signal may be processed by the processor 52 of the mobile device 50 in a manner which generates audio data that includes identifying information about the received audio signal and which is subsequently transmitted to the central server 10 for subsequent processing to determine what request the audio signal corresponds to.

Referring still to FIGS. 1, 2A-2B, and 3, in this exemplary method, the specific request derived from the processing of the audio signal is a request, which, when received and processed by the central server 10, causes the central server 10 to communicate select store-related data stored within the database 20 (e.g., a digital coupon or nutritional information related to a specific product located in or proximate to the designated area 70) to the mobile device 50 alone or both the mobile device 50 and the display unit 40, as indicated by step 208 in FIG. 3. In this regard, in response to receiving the request from the mobile device 50, the central server 10 queries the database 20 to retrieve the requested store-related data and then communicates the retrieved data via the network 60 to the mobile device 50 or the mobile device 50 and the display unit 40, as indicated in step 210 of FIG. 3.

To reduce instances where the processor 12 of the central server 10 remains processing and/or the display unit 40 remains displaying information which is no longer of interest or of value to the individual (e.g., if the individual walks away from the designated area 70 in which a specific product is located after the mobile device 50 has communicated a request for store-related data related to that product), in this exemplary method, the processing of the request transmitted from the mobile device 50 and communication of store-related data corresponding to the request from the central server 10 to the mobile device 50 or to the mobile device 50 and display unit 40 ends in response to the mobile device 50 leaving the designated area 70. In this regard, the central server 10 is configured to check, either periodically or substantially continuously, whether the mobile device 50 is located within the designated area 70, as indicated by step 212 in FIG. 3.

As noted above, in this implementation, the audio transmitter 30 is configured to substantially continuously emit the audio signal. Accordingly, while the mobile device 50 is located in the designated area 70, the mobile device 50 is, in turn, substantially continuously receiving the audio signal while the microphone 51 is activated. To assist the central server 10 in determining whether the mobile device 10 is located in the designated area 70, in this implementation, the mobile device 50 is, while located in the designated area 70, configured to periodically or substantially continuously communicate information to the central server 10 that indicates receipt of the audio signal. After communication between the mobile device 50 and the central server 10 has been initiated as a result of the mobile device's 50 initial processing of the audio signal, the central server 10 will periodically or substantially continuously check to see if it has received information from the mobile device 50 indicating receipt of the audio signal within a predetermined period of time. If the central server 10 determines that such information has not been received within the predetermined period of time, the central server 10 will then determine that the mobile device 50 is positioned outside of the designated area 70 and cease communication with the mobile device 50 or the mobile device 50 and the display unit 40, as perhaps evidenced best by comparing the displays 42, 55 of the display unit 40 and mobile device 50 in FIGS. 2A-2B.

Referring specifically to FIG. 3, if the central server 10 determines the mobile device 50 is located within the designated area 70, the central server 10 will then determine whether the store-related data requested by the mobile device 50 has been successfully communicated to the mobile device 50 or the mobile device 50 and the display unit 40, as indicated by step 214 in FIG. 3. Verification of such communication may, in some implementations, be provided by the mobile device 50 communicating an acknowledgement signal to the central server 10. If the central server 10 determines that the requested store-related data was not successfully communicated to the mobile device 50 or the mobile device 50 and the display unit 40 (e.g., by not receiving an acknowledgement signal within a predetermined period of time), the central server 10 will proceed to repeat steps 210, 212, and 214 until the central server 10 determines the requested store-related data was successfully communicated.

Referring still to FIG. 3, in this exemplary method, after the requested store-related data is communicated to the mobile device 50 or the mobile device 50 and the display unit 40, the mobile device 50 determines whether the software application 56 should continue to be provided access to the microphone 51 so that additional audio signals can be received and processed by the mobile device 50, as indicated by step 216 in FIG. 3. In this implementation, access to the microphone 51 can be restricted by the individual selecting an option presented by the software application 56 on the display 55 of the mobile device 50 (e.g., by engaging an "End Session" button presented on the display 55). Upon selecting such option, the software application 56 is no longer provided access to the microphone 51, thus preventing the mobile device 50 from processing audio signals transmitted by the audio transmitter 30.

Figure 4:
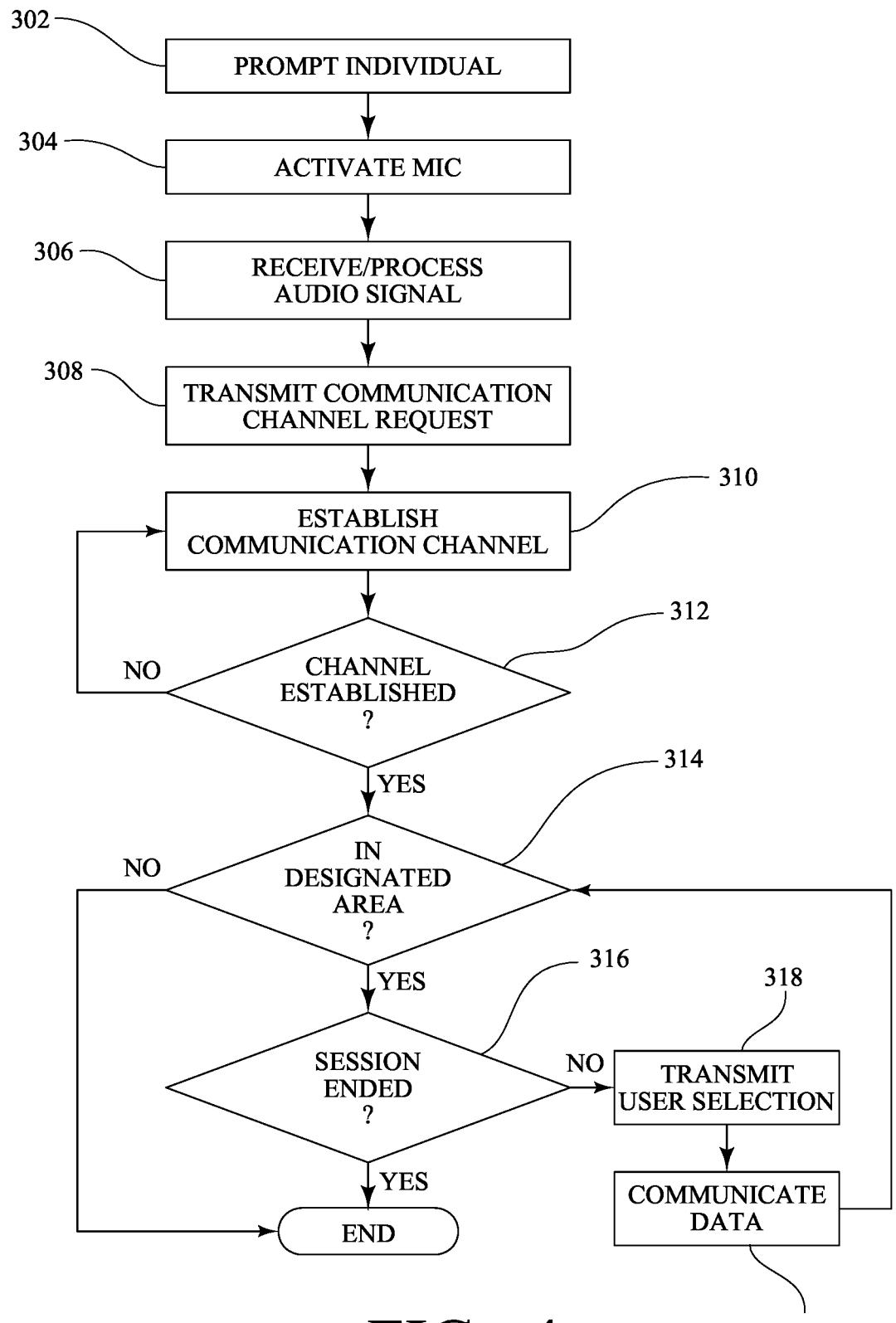
FIG. 4 is a flow diagram of another exemplary method for communicating data to an individual within a physical store using audio in accordance with the present invention.

Referring now generally to FIGS. 1, 2A-2B, and 4, FIG. 4 is a flow diagram of a method for communicating data to an individual within a physical store using audio, which utilizes the exemplary system 100 described above with reference to FIGS. 1 and 2A-2B. The exemplary method shown in FIG. 4 is similar to that of FIG. 3 described above, except that instead of the request derived from the audio signal received and processed by the mobile device 50 being a request to the central server 10 for select store-related data stored in the database 20, it is a request for the central server 10 to establish a communication channel with the mobile device 50 (e.g., a request for the central server 10 to establish a socket-based connection between the mobile device 50 and the central server 10), as indicated by step 308 in FIG. 4. In this regard, this exemplary method also includes prompting the individual via the display unit 40, activating the microphone 51, and receiving and processing the audio signal transmitted by the audio transmitter 30, as indicated by steps 302, 304, and 306 in FIG. 4, in the same manner as described above with reference to steps 202, 204, and 206 of FIG. 3.

Referring still to FIGS. 1, 2A-B, and 4, in response to receiving the request to establish a communication channel between the mobile device 50 and the central server 10 (e.g., establishing a socket-based connection in which the mobile device 50 is connected to a port of the central server 10), the central server 10 can accept the request and establishes a connection between the mobile device 50 and the central server 10 through which information can be subsequently exchanged between the two. In this exemplary method, once the communication channel is established, it is tested to confirm that information can successfully be communicated between the mobile device 50 and the central server 10, as indicated by step 312 in FIG. 4. In this regard, the software application 56 installed on the mobile device 50 and the memory component 14 of the central server 10 may include test instructions (routines) which, when executed, cause the mobile device 50 and the central server 10 to send a test communication to each other and confirm that each communication was actually received at its intended destination. If an error is detected by either mobile device 50 or the central server 10, then steps 310 and 312 will be repeated until it is determined that the communication channel has been successfully established.

Referring still to FIGS. 1, 2A-2B, and 4, once the communication channel is established between the mobile device 50 and the central server 10, in this exemplary method, the central server 10 will check, either periodically or substantially continuously, whether the mobile device 50 is located within the designated area 70, as indicated in step 314 of FIG. 4, in the same manner as described above with reference to step 212 of FIG. 3. If the central server 10 determines that the mobile device 50 is outside of the designated area 70, the central server 10 will close the communication channel (e.g., close the socket-based connection). In this exemplary method, the central server 10 will also check to determine whether the individual associated with the mobile device 50 has taken some action which indicates that communication with the central server 10 is no longer desired, as indicated by step 316 in FIG. 4. In some implementations, such action may include the individual selecting an option presented by the software application 56 on the display 55 of the mobile device 50 (e.g., by engaging an "End Session" button presented on the display 55) or the individual closing the software application 56 (i.e., stop the software application 56 from running on the mobile device 50). If the central server 10 determines that such action has been taken, the central server 10 will close the communication channel. Conversely, if the central server 10 determines the mobile device 50 is located within the designated area 70 and the individual has not taken any such action, the communication channel will remain open, thereby enabling the individual to communicate requests for select store-related data from the database 20, as indicated by step 318 in FIG. 4.

Referring still to FIG. 4, in this exemplary method, requests for store-related data are communicated to the central server 10 in response to the individual associated with the mobile device 50 making selections or otherwise interacting with an interface presented on the mobile device 50 by the software application 56. For instance, in some implementations, the interface may present the individual with the option to select one or more digital coupons associated with products located within the physical store, and, upon selecting one of the digital coupons, a request for the same is transmitted from the mobile device 50 to the central server 10. Upon receiving such request, the central server 10 processes the request by querying the database 20 to retrieve the requested store-related data and then communicates the retrieved data, which, in the foregoing example, is a digital coupon, via the network 60 to the mobile device 50 or the mobile device 50 and the display unit 40, as indicated in step 320 in FIG. 4. The individual can continue to communicate requests for store-related data to the central server 10 in the same way until the communication channel is closed (e.g., as a result of the mobile device 50 being positioned outside of the designated area 70 or the individual closing the software application 56 on the mobile device 50).

The methods described herein can also be adapted for use in systems which include multiple audio transmitters, multiple display units, and/or multiple mobile devices, such as the system 400 described above with reference to FIG. 5.

As a further refinement, although the above-described systems and methods have been described with particular reference to the use of a display unit for displaying information to an individual, in some embodiments, systems and methods for communicating data to an individual are also provided in which the individual is not present in a physical store and in which a display unit is not utilized. Such systems and methods similarly make use of a central server that is operably connected to (in communication with) a database storing store-related data, as well as a mobile device that is associated with a particular individual and that is in communication with the central server via a software application installed on the mobile device. The mobile devices also includes a microphone for receiving the audio signal through the mobile device, such as an inaudible audio signal. Rather than having an audio transmitter that transmits the audio signal within the physical store, however, the audio signal is broadcast from a standard radio, satellite radio, audio streaming software application, or the like. In this way, the systems and methods of the present invention can also be utilized such that audio signal can be received by a microphone of an individual's mobile device and processed by the processor of the mobile device, and thereby initiate a communication between the mobile device and the central server and receive store-related data when an individual is in a car, boat, airplane, or the like (i.e., when the individual is not present within the physical store).

One of ordinary skill in the art will recognize that additional embodiments and implementations are also possible without departing from the teachings of the present invention or the scope of the claims which follow. This detailed description, and particularly the specific details of the exemplary embodiments disclosed herein, is given primarily for clarity of understanding, and no unnecessary limitations are to be understood therefrom, for modifications will become apparent to those skilled in the art upon reading this disclosure and may be made without departing from the spirit or scope of the claimed invention.

What is claimed is:

1. A system for communicating data to an individual within a physical store using audio, comprising:
   a central server;
   a database in communication with the central server, the database storing store-related data;
   a mobile device associated with the individual and being configured to selectively communicate with the central server via a software application installed on the mobile device;
   a display unit for displaying information to the individual; and
   an audio transmitter configured to transmit an audio signal to a designated area within the physical store, the designated area corresponding to an area of the physical store located proximate to the display unit or in which the display unit is located;
   wherein the audio signal, when received in the designated area by a microphone of the mobile device and processed by a processor of the mobile device, initiates a communication between the mobile device and the central server;
   wherein the communication between the mobile device and the central server includes initializing a communication channel between the mobile device and the central server;
   wherein the display unit is external to the mobile device;
   wherein the display unit is a kiosk that is in communication with the central server, the kiosk including an interface configured to receive a selection by the individual relating to the store-related data; and
   wherein the audio transmitter transmits the audio signal in response to the selection by the individual.

2. The system according to claim 1, wherein store-related data is communicated to the mobile device through the communication channel.

3. The system according to claim 1, wherein the communication between the mobile device and the central server ends in response to the mobile device being positioned outside of the designated area.

4. The system according to claim 1, wherein the audio signal is associated with a request for select store-related data within the database, and wherein the communication between the mobile device and the central server includes the central server communicating the select store-related data to the mobile device.

5. The system according to claim 1, wherein the display unit is in communication with the central server and includes a digital display for displaying store-related data received from the central server.

6. The system according to claim 5, wherein the audio signal, when received by the microphone and processed by the processor of the mobile device, initiates a communication between the display unit and the central server.

7. The system according to claim 6, wherein, following the processor of the mobile device processing the audio signal, the central server communicates store-related data to both the mobile device and the display unit.

8. The system according to claim 7, wherein the store-related data communicated to the mobile device is different from the store-related data communicated to the display unit.

9. The system according to claim 1, wherein the audio signal has an inaudible frequency.

10. A method for communicating data to an individual within a physical store using audio, comprising:
    transmitting, via an audio transmitter, an audio signal to a designated area within the physical store, the designated area corresponding to an area of the physical store located proximate to a display unit for displaying information to the individual or in which the display unit is located, wherein the display unit is a kiosk that is in communication with a central server and includes an interface configured to receive a selection by the individual relating to store-related data;
    receiving in the designated area, via a microphone of a mobile device associated with the individual, the audio signal;
    processing, via a processor of the mobile device, the audio signal; and
    initiating, by the mobile device, a communication between the mobile device and the central server in response to the mobile device receiving and processing the audio signal, the central server being in communication with a database storing store-related data;
    wherein initiating the communication between the mobile device and the central server includes initializing a communication channel between the mobile device and the central server;
    wherein the display unit is external to the mobile device; and
    wherein the audio signal is transmitted in response to the selection by the individual.

11. The method according to claim 10, wherein store-related data is communicated to the mobile device through the communication channel.

12. The method according to claim 10, and further comprising:
    ending the communication between the mobile device and the central server in response to the mobile device being positioned outside of the designated area.

13. The method according to claim 10, wherein the audio signal is associated with a request for select store-related data within the database, and wherein the communication between the mobile device and the central server includes the central server communicating the select store-related data to the mobile device.

14. The method according to claim 10, wherein the display unit is in communication with the central server and includes a display for displaying store-related data received from the central server.

15. The method according to claim 14 and further comprising:
    initiating, by the mobile device, a communication between the display unit and the central server in response to the mobile device receiving and processing the audio signal.

16. The method according to claim 15 and further comprising: communicating store-related data to both the mobile device and the display unit following the mobile device processing the audio signal.

17. The method according to claim 10, wherein the audio signal has an inaudible frequency.

18. A method for communicating store-related data to an individual using audio, comprising:
- transmitting, via an audio transmitter, an audio signal to a mobile device associated with the individual;
- receiving, via a microphone of the mobile device, the audio signal;
- processing, via a processor of the mobile device, the audio signal;
- initiating, by the mobile device, a communication between the mobile device and a central server in response to the mobile device receiving and processing the audio signal, the central server being in communication with a database storing store-related data,
- wherein initiating the communication between the mobile device and the central server includes initializing a communication channel between the mobile device and central server through which select store-related data can be communicated to the mobile device;
- communicating, by the mobile device to the central server, a request for the select store-related data in response to the individual making a selection corresponding to the select store-related data on an interface presented on the mobile device subsequent to the audio signal being processed by the processor of the mobile device; and
- communicating, by the central server to the mobile device, the select store-related data subsequent to receiving the request from the mobile device.

\* \* \* \* \*